United States Patent
Maciejczyk

(10) Patent No.: US 7,168,762 B2
(45) Date of Patent: Jan. 30, 2007

(54) SECURITY STRAP SYSTEM

(75) Inventor: Wieslaw Maciejczyk, Sunshine (AU)

(73) Assignee: Britax Childcare Pty Ltd, Sunshine (AU)

(*) Notice: Subject to any disclaimer, the term of this patent is extended or adjusted under 35 U.S.C. 154(b) by 48 days.

(21) Appl. No.: 10/646,424

(22) Filed: Aug. 22, 2003

(65) Prior Publication Data
US 2004/0051355 A1 Mar. 18, 2004

(30) Foreign Application Priority Data
Sep. 3, 2002 (AU) .............................. 2002951170

(51) Int. Cl.
A47C 1/08 (2006.01)

(52) U.S. Cl. .................................. 297/253; 297/250.1

(58) Field of Classification Search ............. 297/250.1, 297/253
See application file for complete search history.

(56) References Cited

U.S. PATENT DOCUMENTS

| | | | |
|---|---|---|---|
| 5,536,066 A * | 7/1996 | Sedlack ............... | 297/250.1 X |
| 5,695,243 A | 12/1997 | Anthony et al. ......... | 297/250.1 |
| 6,193,310 B1 | 2/2001 | Batalaris et al. ............ | 297/253 |
| 6,209,957 B1 * | 4/2001 | Baloga et al. .............. | 297/253 |
| 6,543,846 B2 * | 4/2003 | Cone ....................... | 297/250.1 |
| 6,592,183 B2 * | 7/2003 | Kain ...................... | 297/253 X |
| 7,044,548 B2 * | 5/2006 | Mullen et al. .......... | 297/253 X |
| 2002/0113470 A1 | 8/2002 | Kain ..................... | 297/256.16 |

FOREIGN PATENT DOCUMENTS

EP 1 059 194 A1 12/2000

* cited by examiner

Primary Examiner—Anthony D Barfield
(74) Attorney, Agent, or Firm—Davis & Bujold, P.L.L.C.

(57) ABSTRACT

A connecting system for a child car seat (3) of a type which can either be rearward or forward facing. Separate strap paths (7, 8) are associated with the seat for each of the rearward and facing positions of the child car seat. The connecting system has a connecting strap (6) with latches (14) at either end adapted to engage with latching bars on the vehicle. The connecting strap (6) is fixed into a strap path (7, 8) and is sufficiently long so that it can be passed through the front path (8) from opposite sides to cross and to extend out the opposite side of the front path for use when the child car seat is in the rearward facing position or be passed through the rear path (7) from opposite sides to cross and to extend out the opposite side of the rear path for use when the child car seat is in the forward facing position.

22 Claims, 5 Drawing Sheets

SECURITY STRAP SYSTEM

FIELD OF INVENTION

This invention relates to a mounting system for child car seats and more particularly to a mounting system and method of mounting straps suitable for retaining a child car seat within a vehicle without the necessity for using seatbelts.

BACKGROUND OF THE INVENTION

Child car seats may be of the type which are adapted for both forward and rearward facing use and in such seats there is a necessity for two restraining strap paths within the seat to ensure that the child car seat is correctly retained in the vehicle. One restraining strap path is used when the child car seat is in the rearward facing position and the other is used when the child car seat is in the forward facing position. The rearward facing position is generally used for younger babies with the seat on a more reclined position and the forward facing position is generally used for older babies with the seat on a more upright position.

The restraining strap used may be an existing seatbelt in a vehicle but in some vehicles these may not be present or adequate for the purpose of restraining the child car seat.

In an alternative to using a seatbelt for retaining the child car seat there has been proposed a connecting strap system using latches which engage with latch bars mounted into the seat either side of the child car seat position. Once again such a connecting strap must use different belt paths through the seat for rearward and forward facing use.

Separate connecting straps can be provided for each belt path with associated latches and length adjusting mechanisms on each strap but it is desirable that a single connecting strap be used for both forward and rearward facing strap paths. It is important and in some cases mandatory, however, that the connecting strap or straps cannot be removed entirely from the seat because this may encourage people to use the seat without any connecting strap.

It is the object of this invention therefore to provide a system and a method of mounting a strap by which a connecting strap can be used for either rearward or forward facing seats but not be removable from the seat.

BRIEF DESCRIPTION OF THE INVENTION

In one form therefore the invention is said to reside in a connecting system for a child car seat in a vehicle, the child car seat being of a type which can either be rearward or forward facing and having a rear strap path for use when the seat is in the forward facing position and a front strap path for use when the seat is in the rearward facing position, the connecting system including a connecting strap having latches at either end thereof and which are adapted to engage with latching bars on the vehicle, the connecting strap passing through and being fixed in a strap duct, the connecting strap being sufficiently long that respective ends extending from each side of the strap duct can extend out the opposite side of the front strap path for use when the child car seat is in the rearward facing position or extend out the opposite side of the rear strap path for use when the child car seat is in the forward facing position.

In one embodiment the strap duct may be one of the rear strap path and the front strap path.

Where the strap duct is the rear strap path when the restraining strap is used for the forward facing position the strap extends directly to the latch bars and when the seat is used in the rearward facing position the strap is crossed through the front strap path and then extends to the latch bars.

Where the strap duct is the front strap path when the restraining strap is used for the rearward facing position the strap extends directly to the latch bars and when the seat is used in the forward facing position the strap is crossed through the rear strap path and then extends to the latch bars.

Alternatively the strap duct is a separate path across the seat between the front strap path and the rear strap path whereby when the restraining strap is used for the forward facing position the strap is crossed through the rear strap path and then extend to the latch bars and when the seat is used in the rearward facing position the strap is crossed through the front strap path and then extends to the latch bars.

Preferably the connecting strap is fixed into the strap duct by rivets.

The connecting strap can include a length adjuster at one or both ends.

Preferably the latches are arranged to engage, in one orientation only, with the latching bars in the motor vehicle.

In an alternative form the invention is said to reside in a method of restraining a child car seat in a vehicle, the child car seat being of a type which can either be rearward or forward facing and having a rear strap path for use when the seat is in the forward facing position and a front strap path for use when the seat is in the rearward facing position, a connecting strap passing through and being fixed in a strap duct and having portions extending from each side of the strap duct and latches at either end thereof which are adapted to engage with latching bars on the vehicle, the method including the steps of passing respective extending portions of the connecting strap through either the rear or the front strap path from opposite sides and crossing each other and extending out the opposite side of the rear or front strap path for use when the child car seat is in the forward or rearward facing position respectively.

In a further form the invention is said to reside in a connecting system for a child car seat in a vehicle, the child car seat being of a type which can either be rearward or forward facing and having a rear strap path for use when the seat is in the forward facing position and a front strap path for use when the seat is in the rearward facing position, the connecting system including a connecting strap having latches at either end thereof which are adapted to engage with latching bars on the vehicle, the connecting strap passing through and being fixed in the rear strap path, the connecting strap being sufficiently long that respective ends extending from each side of the rear strap path can be passed through the front strap path from opposite sides to cross and to extend out the opposite side of the front strap path for use when the child car seat is in the rearward facing position.

In a further form the invention is said to reside in a method of restraining a child car seat in a vehicle, the child car seat being of a type which can either be rearward or forward facing and having a rear strap path for use when the seat is in the forward facing position and a front strap path for use when the seat is in the rearward facing position, a connecting strap passing through and being fixed in the rear strap path and having portions extending from each side of the rear strap path and latches at either end thereof which are adapted to engage with latching bars on the vehicle, the method including the steps of passing respective extending portions of the connecting strap through the front strap path from opposite sides and crossing each other and extending out the opposite side of the front strap path for use when the child car seat is in the rearward facing position.

In a further form the invention is said to reside in a child car seat for use in a vehicle in a vehicle, the child car seat being of a type which can either be rearward or forward facing and having a rear strap path for use when the seat is in the forward facing position and a front strap path for use when the seat is in the rearward facing position, a connecting strap having latches at either end thereof and which are adapted to engage with latching bars on the vehicle, the connecting strap passing through and being fixed in a strap duct, the connecting strap being sufficiently long that respective ends extending from each side of the strap duct can extend out the opposite side of the front strap path for use when the child car seat is in the rearward facing position or extend out the opposite side of the rear strap path for use when the child car seat is in the forward facing position.

BRIEF DESCRIPTION OF THE DRAWINGS

This then generally describes the invention but to assist with understanding reference will now be made in the accompanying drawings which show preferred embodiments of the invention.

In the drawings.

DISCUSSION OF PREFERRED EMBODIMENTS

Now looking more closely at the drawings the embodiment of the invention shown in shown in FIGS. 1 to 4 it will be seen that the vehicle has a rear seat with a seat back 1 and a seat portion 2 upon which a child car seat generally shown as 3 is fitted.

Figure 1:
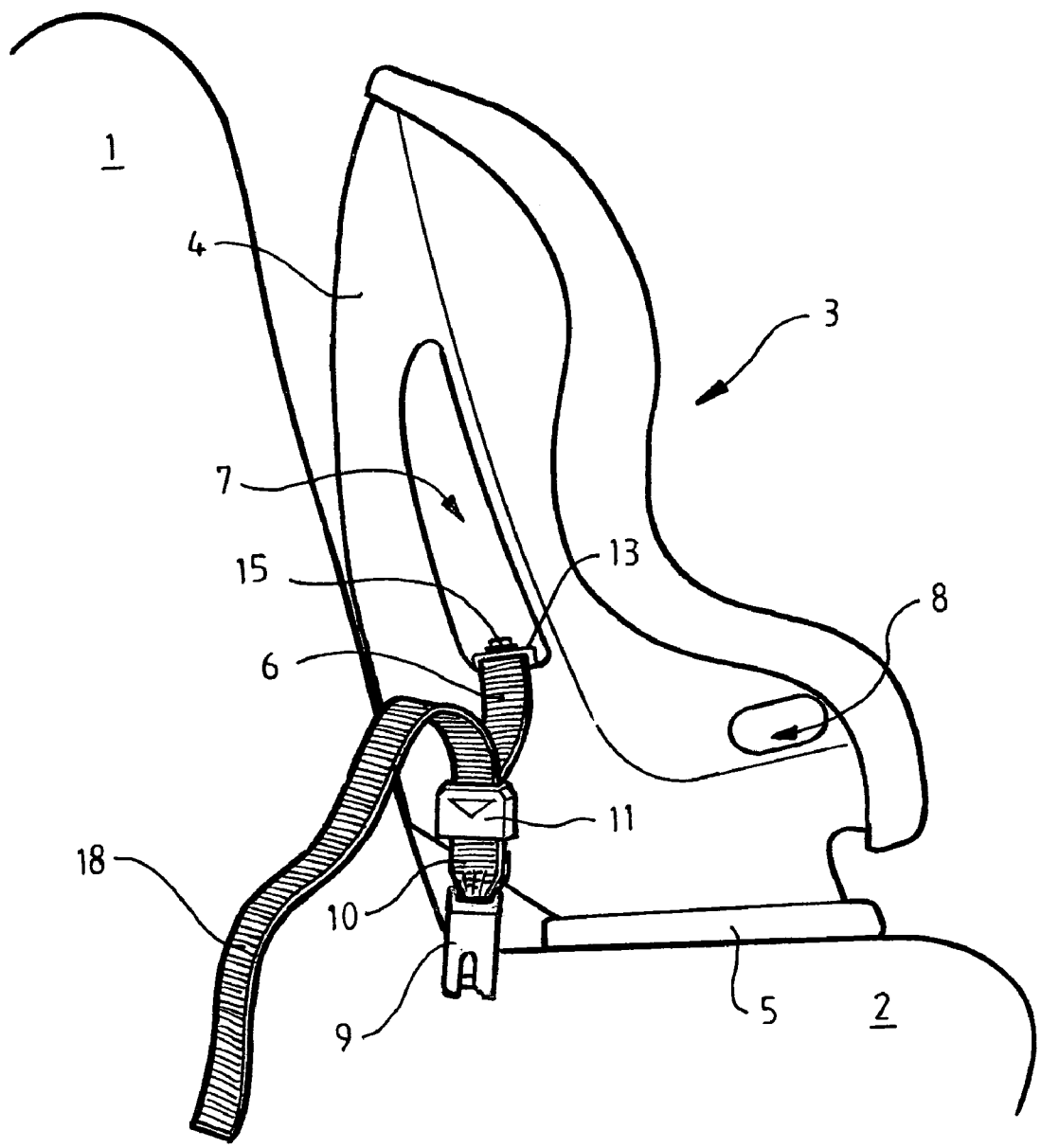
FIG. 1 shows a side view of a child car seat in the forward facing position including the connecting strap of the present invention.
Figure 2:
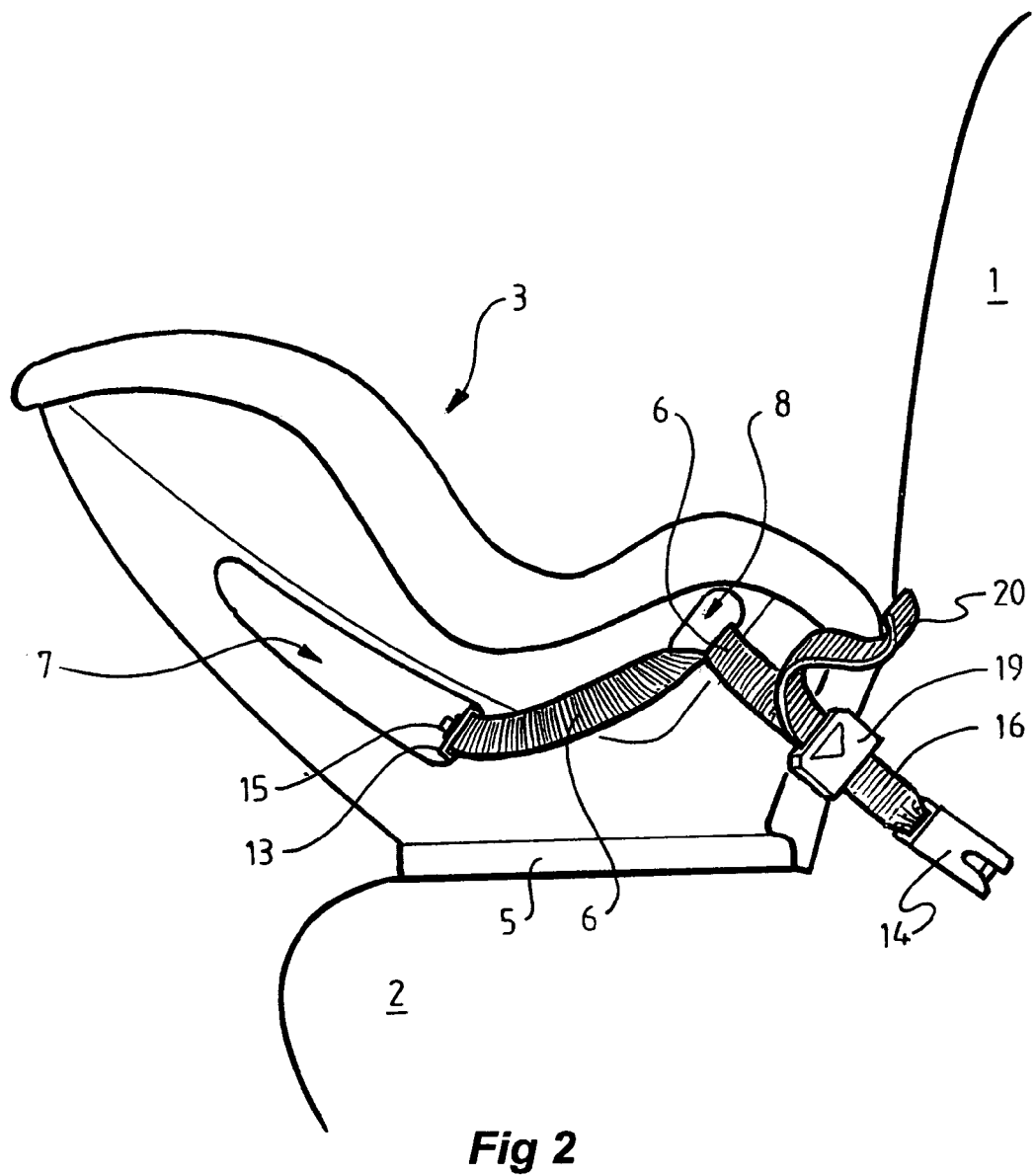
FIG. 2 shows the child car seat of FIG. 1 in the rearward facing position with the connecting strap routed to be used in that position.
Figure 3:
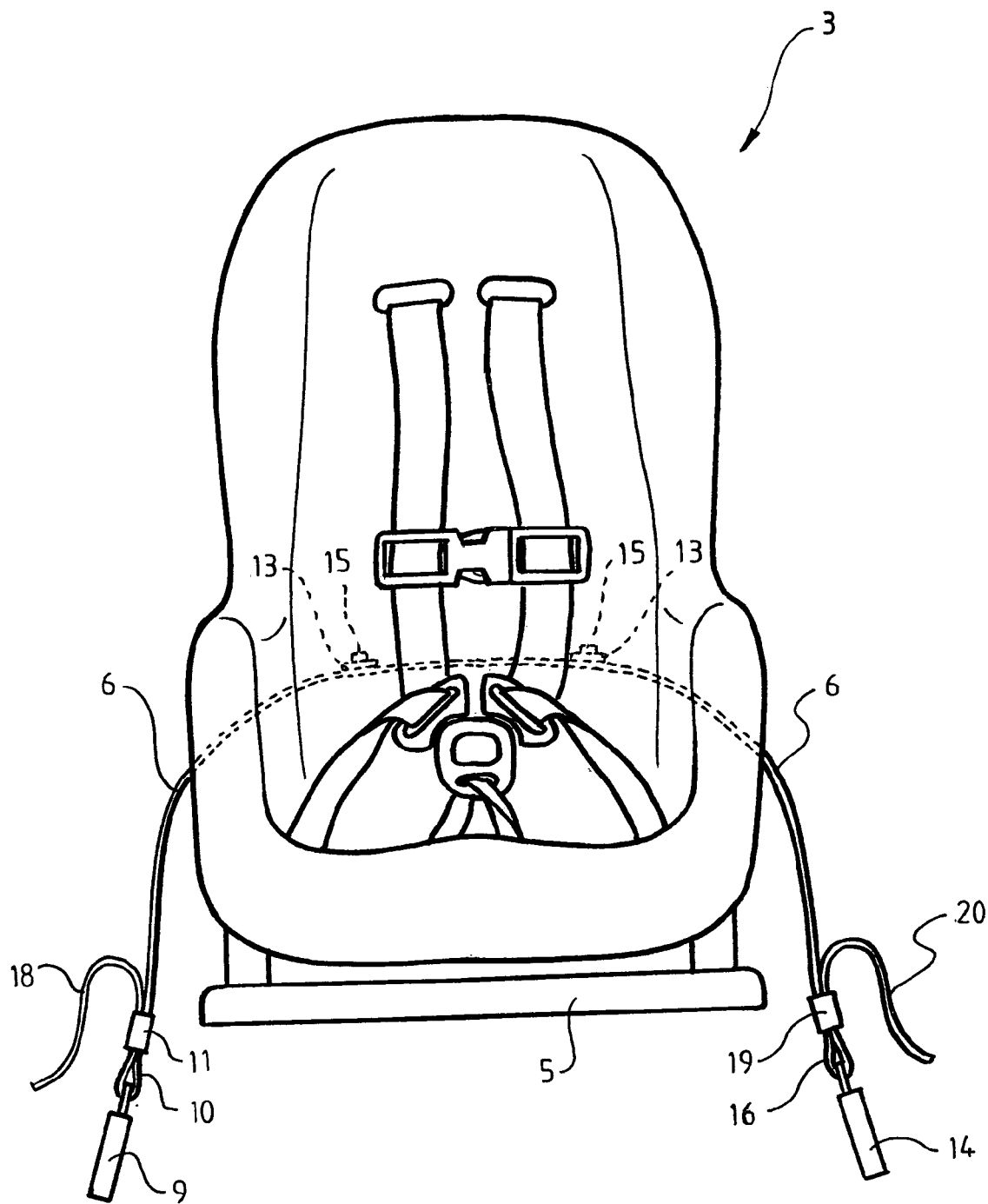
FIG. 3 shows a front view of the child car seat in the position shown in FIG. 1.

In FIGS. 1 and 3 the child car seat is shown as used in the forward facing position. The child car seat has a base 5 which sits on the seat portion 2 of the vehicle seat and the child car seat has a back portion 4 which leans against the seat back 1. The child car seat 3 has a rear belt path 7 and a front belt path 8. A connecting strap 6 passes through a rear belt path 7 in the back portion 4 of the child car seat 3 and has a latch 9 at end 10 which fastens into a latch bar on the seat (not shown). A similar latch 14 is provided a the other end 16 of the connecting strap 6 (see FIGS. 2, 3 and 4). Both latches 9 and 14 are designed so that they can engage with their respective latch bars in one orientation only. The connecting strap 6 includes a length adjuster 11 at the end 10 and a length adjuster 19 at the end 16. To ensure that the connecting strap 6 cannot be removed from the child car seat, a bracket 13 and rivet 15 inside the rear strap path 7 is used. It will be noted that there are long tails 18 and 20 of the strap 6 extending from the length adjusters 11 and 19. These allow the length of the connecting strap 6 to be increased when the seat is used in the rearward facing position as discussed below and as shown in FIGS. 2 and 4.

When in the forward facing position the excess strap can be stored in the rear strap path 7.

Figure 4:
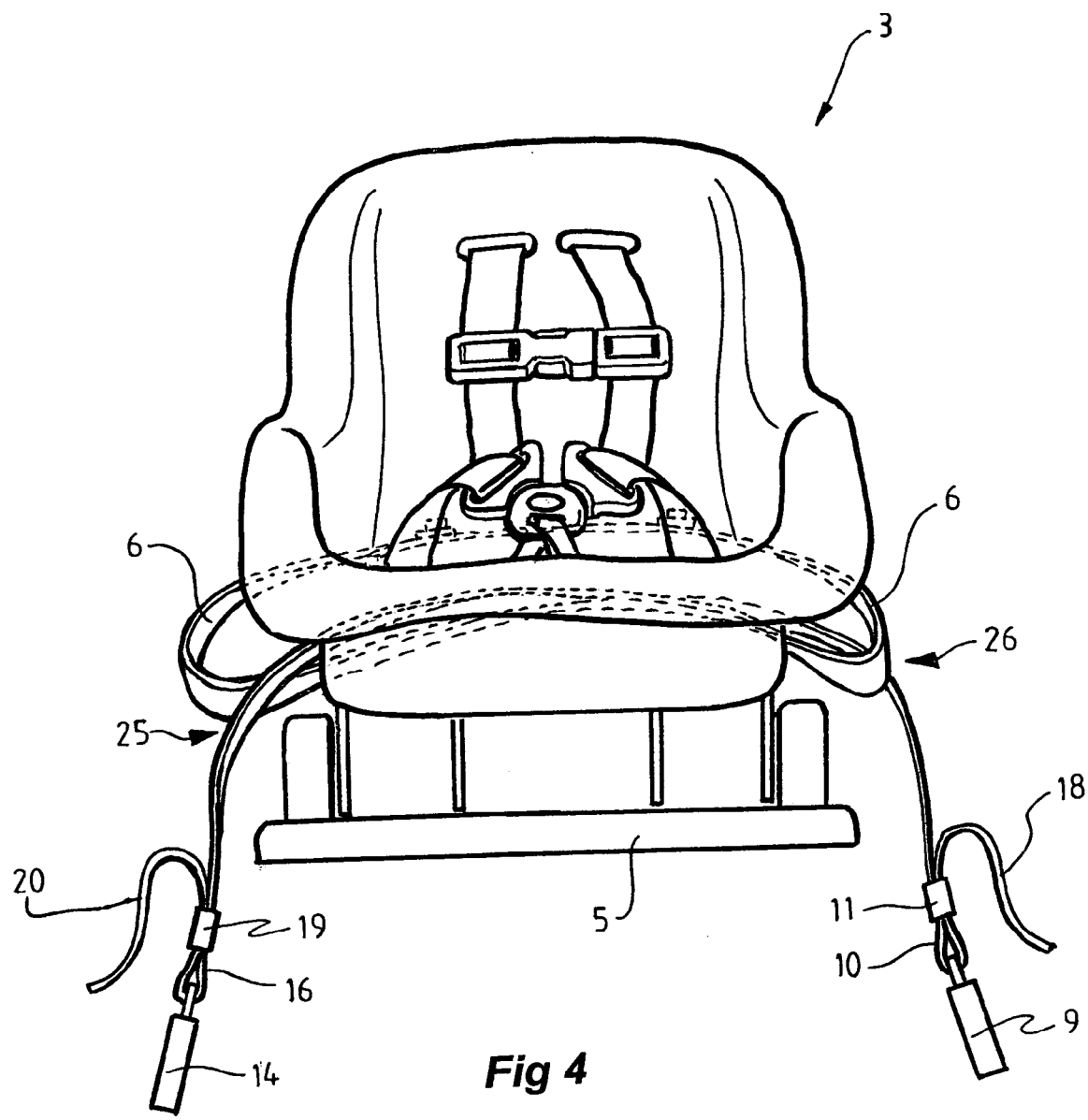
FIG. 4 shows a front view of the child car seat in the position shown in FIG. 2.

When it is desired to use the seat in the rearward facing position as shown in FIGS. 2 and 4 the length of the strap between the seat and the respective length adjusters on each side is increased on both sides by use of the length adjusters 11 and 19. The end 10 of the strap 6 is placed into the front path 8 at one side 25 and the end 16 of the strap 6 is placed into the front path 8 at the other side 26. The belt ends 10 and 16 cross within the front path 8 and the end 10 passes out of the front path 8 at side 26 and the end 16 passes out of the front path 8 at side 25. The latches 9 and 14 are then in the correct orientation to engage with respective latch bars (not shown).

Figure 5:
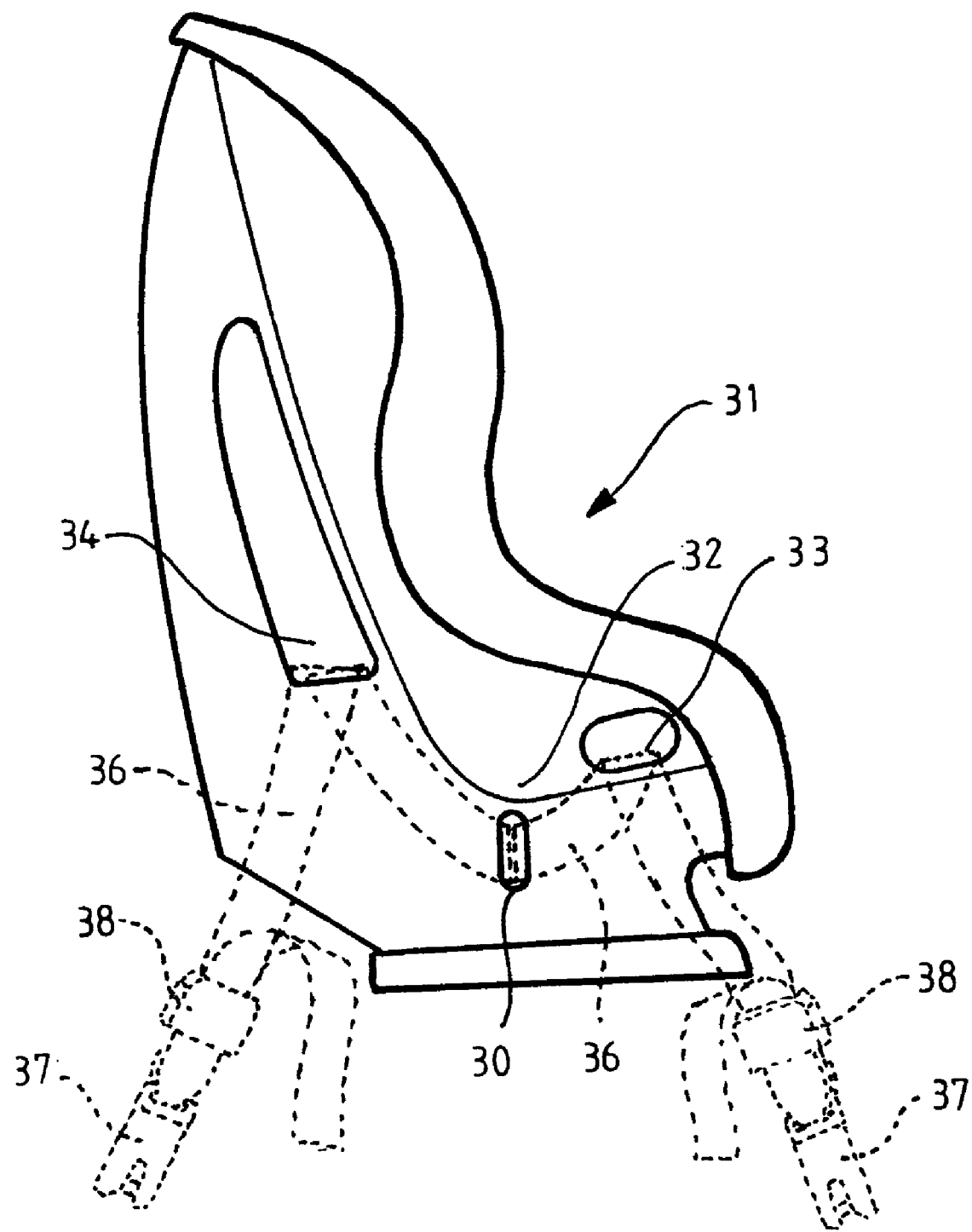
FIG. 5 shows a side view of an alternative embodiment of a child car seat in the forward facing position including the connecting strap system of the present invention.

In FIG. 5 a separate strap path 30 is provided extending across or through the child car seat 31 beneath the seat portion 32 and between the front path 33 and rear path 34. The strap 36 is retained or fastened in the strap path 30 by a rivet or other arrangement (not shown). The strap 36 extends out either side of the strap path 30 and has a latch 37 at each end. Strap ends can be passed from each side of the seat through either the front path 33 or rear path 34 to cross over and to extend out the opposite side depending upon whether the seat is to be used in a rearward or forward facing position respectively. Latches 37 engage with latch bars (not shown) on a vehicle seat.

Alternatively the dimensions of the strap path 40 may be such as to prevent the length adjusters 38 and the latches 37 from passing through the strap path 30 and hence the connecting strap cannot be removed from the seat and the separate fixings to retain the strap 35 within the strap path 30 may not be needed.

It will be seen that by this invention there is provided a retention arrangement by which a connecting strap for child car seat can be retained in association with the seat and not completely removed while still allowing placement for rearward and forward facing positions of the child car seat.

Throughout this specification various indications have been given as to the scope of this invention but the invention is not limited to any one of these but may reside in two or more of these combined together. The examples are given for illustration only and not for limitation.

Throughout this specification unless the context requires otherwise, the words 'comprise' and 'include' and variations such as 'comprising' and 'including' will be understood to imply the inclusion of a stated integer or group of integers but not the exclusion of any other integer or group of integers.

The claims defining the invention are as follows:

1. A connecting system for connecting a child car seat in a vehicle, the system comprising a child car seat in combination with an elongate continuous connecting strap having two opposed ends, the child car seat being of a type which can either be in a rearward or a forward facing position and having a plurality of strap paths comprising at least a front strap path for use when the seat is in the rearward facing position and a rear strap path for use when the seat is in the forward facing position, the connecting strap comprising a latch adjacent each opposed end thereof adapted to engage with a latching bar on the vehicle, the connecting strap being permanently and non-removably affixed to the child car seat in one of the plurality of strap paths and being sufficiently long so that respective ends, extending from each side of the strap path in which the strap is permanently fixed, can also pass through and cross within the front strap path, and extend out the opposite sides of the front strap path for anchoring the child seat to the vehicle seat when the child car seat is in the rearward facing position or pass through and extend out the opposite sides of only the rear strap path for use when the child car seat is in the forward facing position for anchoring the child seat to the vehicle seat.

2. A connecting system in claim 1 wherein the connecting strap permanently fixed in the rear strap path.

3. A connecting system as in claim 1 wherein when the connecting strap is used for the forward facing position the strap extends directly to the latch bars and when the seat is used in the rearward facing position the strap is crossed through the front strap path and then extends to the latch bars.

4. A connecting system as in claim 1 wherein when the connecting strap is used for the rearward facing position the strap extends directly to the latch bars and when the seat is used in the forward facing position the strap is crossed through the rear strap path and then extends to the latch bars.

5. A connecting system as in claim 1 wherein the connecting strap is permanently affixed in an intermediate strap path which is a separate path across the seat between the front strap path and the rear strap path whereby when the connecting strap is used for the forward facing position the strap is crossed through the rear strap path and then extends to the latch bars and when the seat is used in the rearward facing position the strap is crossed through the front strap path and then extends to the latch bars.

6. A connecting system as in claim 1 wherein the connecting strap is fixed into one of the front and rear strap path by rivets.

7. A connecting system as in claim 1 wherein the connecting strap includes a length adjuster at one or both ends.

8. A connecting system as in claim 1 wherein the latches are arranged to engage, in one orientation only, with the latching bars in the motor vehicle.

9. A method of restraining a child car seat in a vehicle comprising a child car seat in combination with an elongate continuous connecting strap having two opposed ends, the child car seat being of a type which can either be in a rearward or a forward facing position and having a plurality of strap paths comprising at least a front strap path for use when the seat is in the rearward facing position and a rear strap path for use when the seat is in the forward facing position, the connecting strap passing through and being permanently fixed to the child car seat such that the connecting strap always passes through only one of the rear and the front strap paths when the child car seat is in one of the forward and the rearward facing positions and the connecting strap passes through both the rear and the front strap paths when the child car seat is in the other of the forward and the rearward facing positions the connecting strap having portions extending from each side of the respective strap path in which the strap is permanently and non-removably affixed, and latches at either end thereof which are adapted to engage with latching bars on the vehicle, the method anchoring the child seat to the vehicle seat including the steps of:

positioning the child car seat in one of the forward and the rearward facing positions and passing respective extending portions of the connecting strap through only one of the rear and the front strap paths and connecting respective end of the latches to the latching bars of the vehicle; and positioning the child car seat on the vehicle car seat in the other of the forward and the rearward facing positions, passing respective extending portions of the connecting strap through one of the rear and the front strap paths, and passing through and crossing over opposed ends of the connecting strap one another within the other of the rear and the front strap paths and connecting respective end of the latches to the latching bars of the vehicle.

10. The method as in claim 9 further comprising the step of fixing the connecting strap in the rear strap path whereby when the connecting strap is used for the forward facing position, the strap extends directly to the latch bars and when the seat is used in the rearward facing position the strap is crossed through the front strap path and then extends to the latch bars.

11. The method as in claim 9 wherein the connecting strap is fixed in the front strap path whereby when the restraining strap is used for the rearward facing position the strap extends directly to the latch bars and when the seat is used in the forward facing position, the strap is crossed through the rear strap path and then extends to the latch bars.

12. The method as in claim 9 wherein the connecting strap is fixed in an intermediate strap path across the seat between the front strap path and the rear strap path whereby when the restraining strap is used for the forward facing position the strap crossed through the rear strap path and then extends to the latch bars and when the seat is used in the rearward facing position the strap is crossed through the front strap path and then extends to the latch bars.

13. The method as in claim 9 wherein the latches are arranged to engage, in one orientation only, with the latching bars in the motor vehicle.

14. The method as in claim 9 wherein the connecting strap is fixed into the respective one of the plurality of strap paths by rivets.

15. The method as in claim 9 wherein the connecting strap includes a length adjuster at one or both ends.

16. A connecting system connecting a child car seat in a vehicle, the system comprising a child car seat in combination with an elongate continuous connecting strap having two opposed ends, the child car seat being of a type which can be in either a rearward or a forward facing position and having a plurality of strap paths comprising at least a front strap path for use when the seat is in the rearward facing position and a rear strap path for use when the seat is in the forward facing position, the connecting strap having a latch adjacent each opposed end thereof for engaging with a latching bar on the vehicle, the connecting strap being permanently and non-removably affixed to the child car seat in one of the front and the rear strap paths and being sufficiently long so that respective ends of the connecting strap can pass through both the front and the rear strap paths with the latches positioned for engaging with the respective latching bars on the vehicle, the connecting strap, in one of the front and rear strap paths, only passing through the strap path in which the strap is permanently fixed with the latches directly engaging with the respective latching bars on the vehicle, and the connecting strap, in the other of the front and the rear strap paths, passing through the strap path in which the strap is permanently fixed and also passing through the other of the front and the rear strap paths prior to the latches engaging with the respective latching bars on the vehicle.

17. A connecting system according to claim 16 wherein the connecting strap is permanency fixed in the rear strap path and the connecting strap includes a length adjuster at at least one end thereof.

18. A connecting system according to claim 16 wherein when the connecting strap is used for the forward facing position the strap extends directly to the latch bars and when the seat is used in the rearward facing position the strap is crossed through the front strap path and then extends to the latch bars.

19. The connecting system according to claim 16 wherein when the connecting strap is used for the rearward facing position the strap extends directly to the latch bars and when the seat is used in the forward facing position the strap is crossed through the rear strap path and then extends to the latch bars.

20. The connecting system according to claim 16 wherein the connecting strap is permanently affixed in an intermediate strap path which is a separate path across the seat between the front strap path and the rear strap path whereby when the connecting strap is used for the forward facing position the strap is crossed through the rear strap path and then extends to the latch bars and when the seat is used in the rearward facing position the strap is crossed through the front strap path and then extends to the latch bars.

21. The connecting system according to claim 16 wherein the connecting strap is fixed into one of the front and rear strap path by rivets and the connecting strap includes a length adjuster at at least one end thereof.

22. A method of restraining a child car seat in a vehicle with a system comprising a child car seat in combination with an elongate continuous connecting strap having two opposed ends, the child car seat being of a type which can be in either a rearward or a forward facing position and having a plurality of strap paths comprising at least a front strap path for use when the seat is in the rearward facing position and a rear strap path for use when the seat is in the forward facing position, the connecting strap having a latch adjacent each opposed end thereof for engaging with a latching bar on the vehicle, the connecting strap being permanently and non-removably affixed to the child car seat in one of the front and the rear strap paths and being sufficiently long so that respective ends of the connecting strap can pass through both the front and the rear strap paths with the latches positioned for engaging with the respective latching bars on the vehicle, the method of restraining a child car seat comprising the steps of:

when positioning the child car seat on the vehicle car seat in one of the forward and the rearward facing positions and passing respective extending portions of the connecting strap through only one of the rear and the front strap paths and connecting respective end of the latches to the latching bars of the vehicle; or and when positioning the child car seat on the vehicle car seat in the other of the forward and the rearward facing positions, passing respective extending portions of the connecting strap through one of the rear and the front strap paths, and passing through and crossing over opposed ends of the connecting strap one another within the other of the rear and the front strap paths and connecting respective end of the latches to the latching bars of the vehicle.

* * * * *